Aug. 25, 1964     D. BERLIN     3,146,026
CHILD'S CAR SEAT
Filed March 27, 1962     2 Sheets-Sheet 1
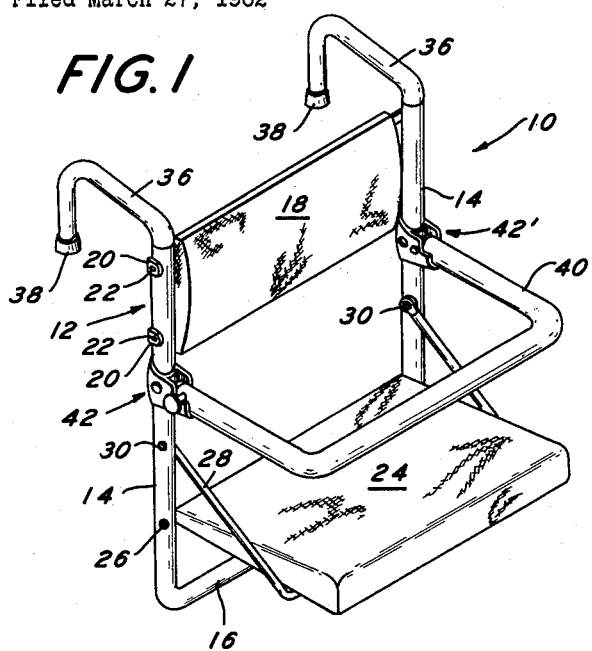
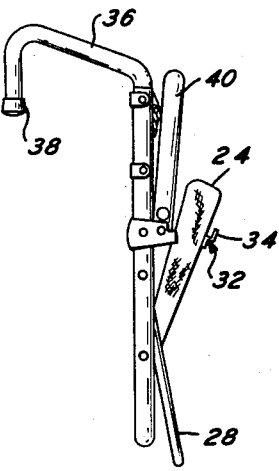
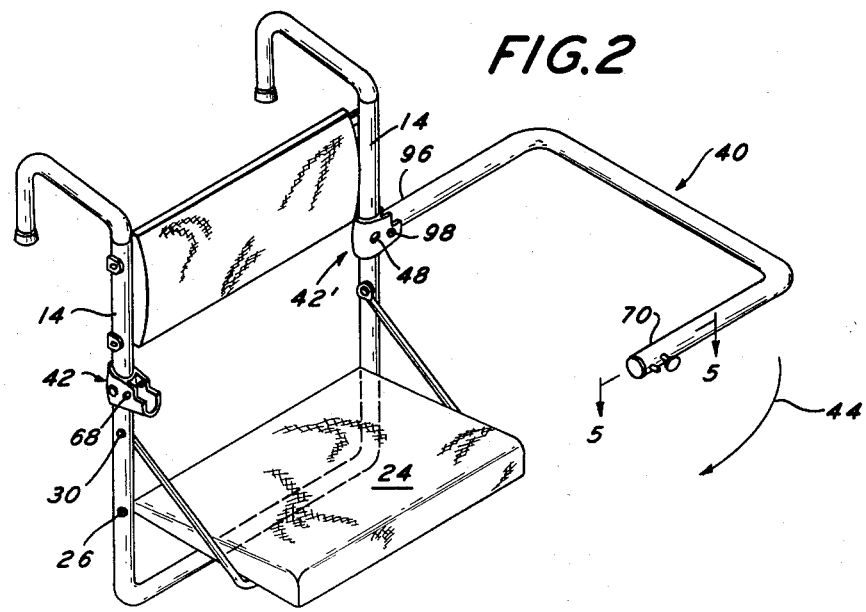
INVENTOR.
DANIEL BERLIN
BY
Caesar and Rivise
ATTORNEYS.

Aug. 25, 1964  D. BERLIN  3,146,026
CHILD'S CAR SEAT
Filed March 27, 1962  2 Sheets-Sheet 2
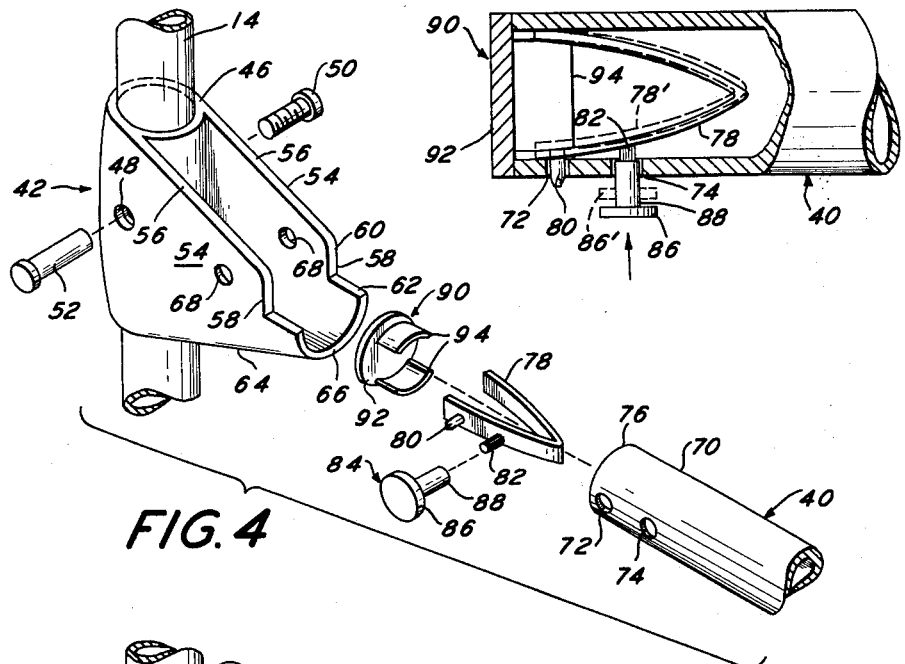
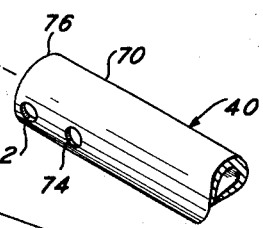
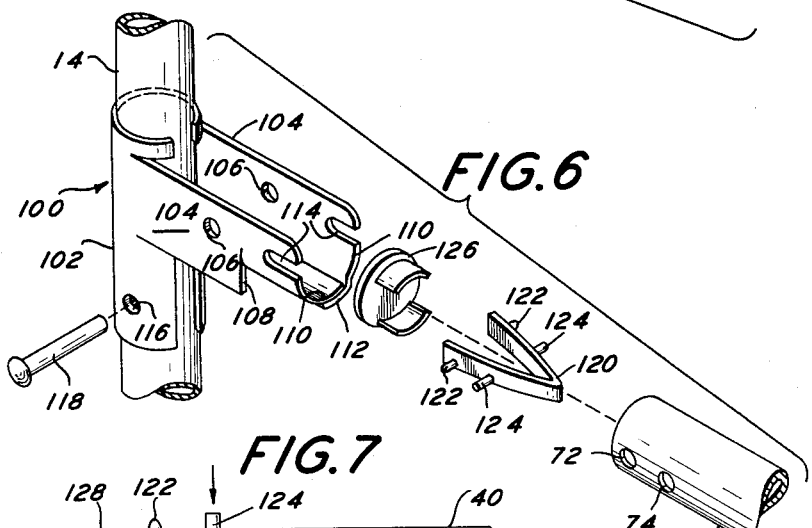
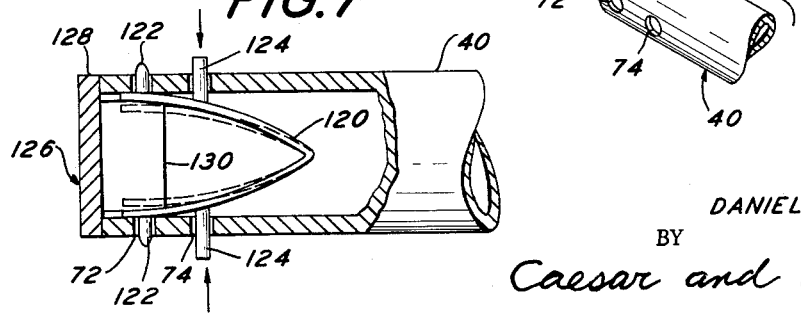
INVENTOR.
DANIEL BERLIN
BY
Caesar and Rivise
ATTORNEYS.

United States Patent Office 3,146,026
Patented Aug. 25, 1964

3,146,026
CHILD'S CAR SEAT
Daniel Berlin, 4424 Paul St., Philadelphia, Pa.
Filed Mar. 27, 1962, Ser. No. 182,779
6 Claims. (Cl. 297—255)

This invention relates to a car seat which is secured to the back portion of the front seat of a car for supporting a child therein.

More particularly this invention relates to a novel guard rail supporting bracket structure for use on said car seat.

Car seats for supporting children are well known in the art. These seats basically comprise a seat portion, a back portion, a frame for holding said seat portion and said back portion in a horizontal and vertical disposition, respectively, means for securing the frame to the back of a car seat and a guard rail for holding a child within the seat. In the past many improvements have been made in this basic car seat structure. Included among them were means for making the entire assembly collapsible. Other means were provided for making the guard rail pivotable on one side thereof so that the guard rail could be opened to permit a child to be easily inserted on the car seat. Thereafter the guard rail is closed and permanently secured in place to prevent the child from falling out.

In one of the car seats previously made the guard rail was pivotably opened either clockwise or counterclockwise; however, none of the car seats had any provisions for easily changing the side from which the guard rail opened. Using the rail securing brackets of the instant invention it is possible with a minimum of difficulty to change the guard rail from a left hand opening position to a right hand opening position, or vice versa, without the loss of time or efficiency of operation.

It is therefore an object of this invention to provide a car seat having a novel pivotable and rotatable guard rail assembly.

It is another object of this invention to provide a guard rail assembly on a car seat which may be easily adjusted to provide a guard rail which may be opened alternatively from either side of the car seat.

It is a further object of this invention to provide a novel guard rail assembly for a car seat which is efficient in operation and attractive in appearance.

These and other objects of this invention are accomplished by providing a car seat comprising a frame, a back portion secured to said frame, a seat portion secured to said frame, means for securing said frame to an automobile seat, a tubular guard rail, means for securing said guard rail to said frame, said means including first and second brackets slidably engaging said frame with one end of said guard rail pivotally secured to said first bracket, said first bracket being free to rotate around said frame, said second bracket being fixedly secured to said frame and including a pair of substantially vertical walls for receiving the other end of said guard rail therebetween, at least one of said walls having a hole formed therein, and said other end of said guard rail having a resiliently mounted, depressible locking pin therein, said pin protruding out of a hole formed in the guard rail and being adapted to be received within said hole in said vertical wall.

Other objects and many of the attendant advantages of this invention will be readily appreciated as the same becomes better understood by reference to the following detailed description when considered in connection with the accompanying drawings wherein:

FIG. 1 is a perspective view of the car seat of this invention with the guard rail in its closed position;

FIG. 2 is a perspective view of the car seat of this invention similar to FIG. 1 but showing the guard rail in its open position;

FIG. 3 is a side elevational view of the car seat of this invention in its collapsed condition;

FIG. 4 is an exploded perspective view of the rail supporting bracket and the spring assembly of the guard rail which is received in said bracket;

FIG. 5 is an enlarged sectional view taken along the lines 5—5 of FIG. 2;

FIG. 6 is an exploded perspective view of a modification of the rail bracket and rail securing spring means of this invention; and, FIG. 7 is a sectional view of one end of the guard rail illustrating the modified spring clamping means in place.

Referring now in greater detail to the various figures of the drawings wherein similar reference characters refer to similar parts, an improved child's car seat embodying the present invention is generally shown at 10 in FIG. 1.

Device 10 basically comprises a U-shaped tubular frame 12 having legs 14 and integral bridging section 16 lowermost. A back portion 18 is secured between leg 14 by a pair of bars 20 which are riveted to the frame 12, as at 22. A seat 24 is pivotally mounted between legs 14 by means of rods 26 which are secured in said legs. A U-shaped rod 28 is pivotally secured to legs 14 by means of rivets 30. The underside of seat 24 is provided with a clamp 32 (FIG. 3). The lower edge 34 of clamp 32 lies parallel to seat 24 and is vertically spaced therefrom.

Rotatably mounted in the open ends of tubular legs 14 are a pair of tubular hooks 36. Each of these hooks is provided with rubber end caps 38. A tubular guard rail 40 is rotatably mounted on frame 12 by means of a pair of brackets 42 and 42'. When it is desired to use the car seat in an automobile, the seat is suspended from the back of the front seat of the automobile by placing hooks 36 thereover. Rubber end caps 38 prevent any damage to the upholstery of the automobile.

In use, seat 24 is maintained in a substantially horizontal orientation by engaging U-shaped rod 28 in clamp 32. Guard rail 40 is pivoted outwardly as shown in FIG. 2. A child can then walk and sit in the car seat, or is easily placed therein. After the child is in place, guard rail 40 is returned to the position shown in FIG. 1 by rotating it in the direction of arrow 44 of FIG. 2 and securing the guard rail within bracket 42.

If desired, the car seat can also be used as a safety device when the child is standing on the front seat of a car. This can be accomplished by pivoting seat 24 upwardly from the position shown in FIG. 2 whereby U-shaped rod 28 can be disengaged from clamp 32. The U-shaped rod and seat 24 can then be dropped into a vertical position. While in this position a child can then walk into the area of the car seat and the guard rail 40 can be closed around him. Brackets 42 will retain the guard rail in a horizontal disposition and while so maintained the guard rail will prevent the child from moving around the car or falling forward while he is standing on the front seat.

The car seat is collapsible for easy storage by disengaging U-shaped rod 28 from the clamp 32 and pivoting the rod as shown in FIG. 3. Guard rail 40 can also be pivoted upwardly as seen in FIG. 3. Although not shown, the collapsing is completed by rotating hooks 36 inwardly from the position shown in FIGS. 1 to 3.

The many advantages of this invention are obtained by using the novel guard rail securing bracket 42. One embodiment of this bracket is shown in FIG. 4. Bracket 42 shown therein is molded from plastic and basically comprises a vertical tubular section 46 which is frictionally telescoped over legs 14 in use. A pair of spaced holes 48 are provided in opposite walls of the tubular section. These holes are alignable with similar holes in legs 14 and may be maintained in that position by means of bolt 50 and internally threaded sleeve which is screwed over said bolt.

Extending outwardly from the tubular section are a pair of substantially vertical spaced walls 54. The tops 56 of said walls are downwardly inclined from the top of the tubular section 46. An open recess 58 is provided at the outer end of each wall. Recess 58 includes vertical wall 60 and horizontal wall 62 perpendicular to said vertical wall.

The undersurface 64 of said bracket is semi-circular in cross-section and extends upwardly from the lower edge of the tubular section. Vertical walls 54 are integral with, and terminate in, said undersurface. The outer edge 66 of walls 54 is also semi-circular in cross-section and serves to support guard rail 40 in a manner which will hereinafter be explained. A pair of aligned opposed holes 68 are provided in side walls 54.

Bracket 42 may be made from any number of moldable plastics. Included among them are polyethylene, polypropylene, polytetrafluoroethylene (Teflon), and nylon.

One end 70 of tubular guard rail 40 is releasably and pivotally secured within bracket 42. To obtain this securement, end 70 is provided with aligned holes 72 and 74. As noted in FIG. 4, hole 72 is adjacent the outer edge 76 of tubular guard rail 40. A V-shaped spring steel member 78, having the outer end thereof slightly wider than the internal diameter of guard rail 40 is inserted within the guard rail. After the insertion, a pin 80, which is adjacent the front of member 78, and is secured thereto, protrudes out of hole 72. A second pin 82, which is secured to member 78, protrudes out of hole 74. As noted in FIG. 4, second pin 82 has a knurled or roughened surface. A push button 84 having a flat circular head 86 and protruding sleeve 88 telescopingly engages second pin 82 after member 78 has been inserted within the guard rail. Since the second pin 82 has the knurled surface, push button 84 is frictionally held in place.

After member 78 has been inserted, the end of the guard rail is closed by means of cap 90. Cap 90 includes a disk 92 and inwardly projecting arcuate flanges 94. As seen in FIG. 5, the outer diameter of disk 92 is the same as the outer diameter of guard rail 40. The flanges 94 abut the top and bottom of guard rail 40 when the cap 90 is in place. The spring member 78 lies between the outer edges of the flanges when the cap is in place (see FIG. 5). The flanges prevent rotation of the spring member within the guard rail.

The car seat is used by securing it to the back of the front seat of an automobile by means of hooks 36. The seat is prepared for reception of the baby by rotating guard rail 40 into the open position shown in FIG. 2. It should be noted in FIG. 2 that end 70 of the guard rail includes the spring connecting member shown in FIG. 4. The other end 96 of the guard rail is pivotally connected to bracket 42′, which is identical to that shown in FIG. 4, by means of pin 98 which passes through aligned holes 68. One difference between the brackets 42 and 42′ resides in the respective mountings. Bracket 42 of FIG. 4 is fixedly secured in place by bolt 50 and sleeve 52. However, bracket 42′ adjacent end 96 is free to rotate about leg 14, since no such securing means is present to prevent rotation.

After a child has been placed on the car seat, it is locked securely in place by rotating guard rail 40 in the direction of arrow 44. The locking is simply accomplished by depressing push button 84 until the head 86 reaches the position shown at 86′. This, in turn, depresses the V-shaped spring steel member 78 to the position shown at 78′ which, in turn, results in the receiving of pin 80 within rail 40. When the pin 80 is depressed, it is a simple matter to insert the end 70 of guard rail 40 within the bracket. When the push button 84 abuts against vertical wall 60 of the bracket, it is released. This, in turn, seats pin 80 in outer hole 68 of the bracket. When it is desired to remove the child, push button 84 is depressed and the guard rail is rotated outwardly in the opposite direction.

The spring connection of this invention provides many advantages over the connections previously used. Since the guard rail is tubular and the spring means are enclosed entirely therein, there is no danger of any pinched fingers resulting from being caught within a spring locking means. Furthermore, the bracket 42 is so constructed as to make seating of the locking pin 80 almost automatic. It should also be noted that guard rail 40 is pivotable about locking pin 80 and pin 98, and can thus be raised to the position shown in FIG. 3 for storage.

As seen in FIG. 2, the guard rail is adapted to be opened from the right side thereof. If it is desired to convert the seat to a left hand opening guard rail, this is simply accomplished by removing bolt 50 and sleeve 52, and pin 98, which is also a bolt and threaded sleeve connection. When the pin 98 is removed, the guard rail is rotated through 180 degrees so that the end 96 is received in bracket 42 and the end 70 is received in bracket 42′. The pin 98 is then inserted through holes 68 of bracket 42 and the bolt 50 and sleeve 52 are inserted through holes 48 in bracket 42′. It thus becomes apparent that bracket 42′ is fixedly secured to leg 14 while bracket 42 is rotatably mounted on leg 14. By this simple adjustment the car seat can quickly be converted from a right to a left hand opening variation. It is only necessary to keep the push button assembly on the side which is to open.

In FIG. 6 there is illustrated a bracket 100 which is similar in function to bracket 42. However, bracket 100 is cut and shaped from a single piece of sheet metal rather than molded from plastic, as is bracket 42. Bracket 100 includes a tubular sleeve 102 which is telescoped over leg 14. Projecting horizontally outwardly from the sides of the sleeve are a pair of vertical walls 104. Walls 104 are provided with a pair of aligned holes 106. The vertical walls 104 are cut at 108 and the resulting tabs 110 are turned inwardly to provide a guard rail receiving lip having a semi-circular cross-section with the top thereof open. The two tabs 110 overlap at 112 and are welded in this position. The outer ends of tabs 110 are provided with elongated horizontal slots 114 which are aligned with holes 106. Tubular sleeve 102 includes a pair of aligned holes 116. These holes are alignable with similar holes in leg 14. Bracket 100 is secured to leg 14 by means of a bolt, similar to bolt 50, and threaded sleeve 118.

A V-shaped spring steel member 120 is inserted in one end of guard rail 40. A pair of locking pins 122, secured to member 120, project out of holes 72 in the guard rail. A second pair of pins 124, also secured to member 120, project out of holes 74 in the guard rail. Pins 124 are slightly greater in length than pins 122. A cap 126, similar to cap 90, is placed in the end of the guard rail 40. Cap 126 includes a disk 128 and arcuate flanges 130.

Bracket 100 and its associated spring connecting means functions in a manner similar to bracket 42 and its associated connecting means. In order to lock guard rail 40 in place, pins 124 are depressed. The guard rail 40 is then slid into bracket 100 with the pins 124 slidingly engaging slots 114. When the pins reach the end of the slots 114 they are released, which, in turn, results in the pins 122 being locked within holes 106.

Bracket 100 can function in a manner identical to that of bracket 42 with respect to the left and right hand opening variation. Thus, bracket 100, by appropriate securements, can rotate on either the left or right leg 14. Likewise, for storage purposes, pins 122 can be pivotally mounted in holes 106 by placing them inside holes 106 when the guard rail is in a vertical position.

Obviously many modifications and variations of the present invention are possible in the light of the above teachings. It is, therefore, to be understood that within the scope of the appended claims the invention may be practiced otherwise than as specifically described.

What is claimed as the invention is:

1. A car seat comprising a tubular frame, a back portion secured to said frame, a seat portion secured to said frame, means for securing said frame to an automobile seat, a tubular guard rail, means for securing said guard rail to said frame, said means including first and second brackets slidably engaging said frame with one end of said guard rail pivotally secured to said first bracket, said first bracket being free to rotate around said frame, said second bracket being adapted to rotate around said frame, each of said brackets including a substantially tubular sleeve telescoped over said tubular frame, said second bracket including a pair of substantially vertical walls extending outwardly from said sleeve, said walls adapted to receive the other end of said guard rail therebetween, at least one of said walls having a hole formed therein, said other end of said guard rail having a resiliently mounted, depressible locking pin mounted therein, said pin protruding out of a hole formed in the guard rail and being adapted to be receive within said hole in said vertical wall, means associated with said guard rail for depressing said locking pin, said vertical walls including a recess at the outer ends thereof, said recess being adapted to serve as a guide for said depressing means to aid in seating the locking pin within said hole in said vertical wall, said recess being opened at its front and its top, whereby the guard rail may be pivoted to a vertical position around said locking pin with said locking pin remaining engaged within said hole in said vertical wall.

2. The car seat of claim 1 wherein said second bracket includes a ledge upon which said other end of said guard rail rests when it is locked in place, said ledge being substantially semi-circular in cross-section.

3. The car seat of claim 1 wherein said brackets are formed from molded plastic.

4. The car seat of claim 1 wherein a V-shaped spring steel member is mounted within said other end of said guard rail, and said locking pin is secured to said member.

5. The car seat of claim 4 wherein said depressing means comprises a second pin which is secured to said spring steel member and protrudes out of a second hole in said guard rail, said record pin being adapted to be received in said recess when said locking pin is engaged in said hole.

6. The car seat of claim 4, and further including an end cap in said guard rail, said end cap including a pair of arcuate flanges which are spaced above and below said spring steel member, whereby said spring steel member is prevented from rotating within said guard rail.

References Cited in the file of this patent

UNITED STATES PATENTS

| | | |
|---|---|---|
| 984,591 | Nelson | Feb. 21, 1911 |
| 1,039,647 | Carter | Sept. 24, 1912 |
| 1,844,410 | Schalk | Feb. 9, 1932 |
| 2,522,394 | Myers | Sept. 12, 1950 |
| 2,533,527 | Soltis | Dec. 12, 1950 |
| 2,723,709 | Welsh | Nov. 15, 1955 |
| 2,774,411 | Berlin | Dec. 18, 1956 |
| 2,790,484 | Pollack | Apr. 30, 1957 |
| 2,974,718 | Lawrence | Mar. 14, 1961 |

FOREIGN PATENTS

| | | |
|---|---|---|
| 814,559 | Great Britain | June 10, 1959 |